US011858662B2

(12) United States Patent  
Gil

(10) Patent No.: US 11,858,662 B2  
(45) Date of Patent: Jan. 2, 2024

(54) AUTONOMOUS DRONE DIAGNOSIS

(71) Applicant: United Parcel Service of America, Inc., Atlanta, GA (US)

(72) Inventor: Julio Gil, Veldhoven (NL)

(73) Assignee: United Parcel Service of America, Inc.

(*) Notice: Subject to any disclaimer, the term of this patent is extended or adjusted under 35 U.S.C. 154(b) by 14 days.

(21) Appl. No.: 17/523,663

(22) Filed: Nov. 10, 2021

(65) Prior Publication Data

US 2022/0063840 A1 Mar. 3, 2022

Related U.S. Application Data

(63) Continuation of application No. 16/414,400, filed on May 16, 2019, now Pat. No. 11,174,045.

(51) Int. Cl.

| | |
|---|---|
| *B64F 5/60* | (2017.01) |
| *B60P 3/11* | (2006.01) |
| *B64C 39/02* | (2023.01) |
| *G06T 7/00* | (2017.01) |
| *G07C 5/00* | (2006.01) |
| *B64F 5/30* | (2017.01) |
| *B64F 1/04* | (2006.01) |
| *G07C 5/08* | (2006.01) |
| *B64U 80/86* | (2023.01) |

(52) U.S. Cl.
CPC .............. *B64F 5/60* (2017.01); *B60P 3/11* (2013.01); *B64C 39/024* (2013.01); *B64F 1/04* (2013.01); *B64F 5/30* (2017.01); *G06T 7/001* (2013.01); *G07C 5/008* (2013.01); *G07C 5/0808* (2013.01); *B64U 80/86* (2023.01); *G06T 2207/30164* (2013.01)

(58) Field of Classification Search
CPC ...... B64F 5/60; B64F 1/04; B64F 5/30; B64F 1/22; B60P 3/11; B64C 39/024; G06T 7/001; G06T 2207/30164; G07C 5/008; G07C 5/0808; B64U 80/86; B64U 2101/60; B64U 30/20; B64U 70/00; B64U 10/13; B64U 70/30
USPC ........................................................ 701/31.4
See application file for complete search history.

(56) References Cited

U.S. PATENT DOCUMENTS

| | | | |
|---|---|---|---|
| 9,815,633 B1 | 11/2017 | Kisser et al. | |
| 9,928,749 B2 | 3/2018 | Gil et al. | |
| 9,957,048 B2 | 5/2018 | Gil | |
| 2009/0114773 A1 | 5/2009 | Helou, Jr. | |
| 2014/0032034 A1* | 1/2014 | Raptopoulos | H04B 7/18506 701/25 |
| 2014/0211207 A1 | 7/2014 | Clark | |
| 2016/0196756 A1* | 7/2016 | Prakash | G06Q 10/083 701/3 |
| 2016/0235236 A1* | 8/2016 | Byers | A47G 29/14 |

(Continued)

*Primary Examiner* — Tyler D Paige  
(74) *Attorney, Agent, or Firm* — SHOOK, HARDY & BACON L.L.P.

(57) ABSTRACT

Embodiments of the present disclosure are directed to systems and methods for autonomously performing and/or facilitating drone diagnostic functions. Prior to a mission of a UAV, an inspection station comprising at least one imaging sensor and at least one directional force sensor may be used to perform a plurality of air worthiness inspections and/or maintenance checks with little to no human intervention. Once the UAV has been determined to be air worthy, it is approved for a subsequent mission.

18 Claims, 10 Drawing Sheets

(56) References Cited

U.S. PATENT DOCUMENTS

| | | |
|---|---|---|
| 2016/0244187 A1 | 8/2016 | Byers et al. |
| 2017/0011340 A1* | 1/2017 | Gabbai ................ G08G 5/0034 |
| 2017/0154347 A1* | 6/2017 | Bateman ................ G06Q 40/08 |
| 2017/0313421 A1 | 11/2017 | Gil |
| 2017/0316376 A1 | 11/2017 | Cooper |
| 2019/0023418 A1 | 1/2019 | Ro |
| 2019/0041856 A1 | 2/2019 | Hippelein et al. |
| 2019/0079511 A1 | 3/2019 | Kessler et al. |
| 2019/0135430 A1 | 5/2019 | Abeles et al. |
| 2019/0143872 A1 | 5/2019 | Gil |
| 2019/0185186 A1 | 6/2019 | Li |
| 2019/0193952 A1 | 6/2019 | Zevenbergen et al. |
| 2020/0074404 A1 | 3/2020 | Gil, Jr. et al. |
| 2020/0361634 A1 | 11/2020 | Gil |

* cited by examiner

AUTONOMOUS DRONE DIAGNOSIS

CROSS-REFERENCE TO RELATED APPLICATIONS

This application is a continuation of and claims the benefit of U.S. application Ser. No. 16/414,400, filed on May 16, 2019, the entirety of which is hereby expressly incorporated by reference.

BACKGROUND

Operation of Unmanned Aerial Vehicles (UAVs) is presently limited to visual line of sight. That is, UAVs must generally be operated within visual contact of an operator. The ability for UAVs to operate beyond visual line of sight (i.e., beyond visual contact of a human operator) may require operators to comply with more stringent regulations relating to system reliability, failsafe redundancies, and maintenance/inspection protocols. While not presently defined, it may be necessary that, in order to operate beyond line of sight, including for commercial purposes such as delivering parcels, UAVs be subjected to safety and maintenance inspections before and/or after each flight/mission.

SUMMARY

At a high level, aspects described herein relate to an autonomous drone diagnosis system for executing various safety and maintenance inspections before and/or after each mission of a UAV. In particular, the drone diagnosis system described herein may be deployed as part of a vehicle-borne UAV control system. One use case for a vehicle-borne UAV control system may be for using UAVs to deliver parcels. Accordingly, the vehicle-borne UAV control system may comprise a delivery truck (e.g., those conventionally used for parcel delivery services), a recovery/launching system, and the drone diagnosis system. Through the use of an autonomous inspection and maintenance system, such as the drone diagnosis system described herein, highly technical inspection and maintenance procedures may be competed without requiring the physical presence of a maintenance technician, increasing efficiency, reducing UAV down time between missions, and ensuring the safe operation of UAVs beyond line of sight, where potentially dangerous faults may be less likely to be detected in real time.

This summary is intended to introduce a selection of concepts in a simplified form that are further described below in the detailed description section of this disclosure. This summary is not intended to identify key or essential features of the claimed subject matter, nor is it intended to be used as an aid in determining the scope of the claimed subject matter.

Additional objects, advantages, and novel features of the technology will be set forth in part in the description which follows, and in part will become apparent to those skilled in the art upon examination of the following or learned by practice of the technology.

BRIEF DESCRIPTION OF THE DRAWINGS

The present technology is described in detail below with reference to the attached drawing figures, wherein.

DETAILED DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

I. Overview

Various embodiments are directed to systems, apparatuses, methods, and computer storage media for performing or facilitating the autonomous inspection and maintenance of UAVs. In one aspect, a system is disclosed comprising a UAV deployment vehicle, an inspection station (also referred to herein as a drone diagnosis system) comprising at least one imaging sensor configured to collect structural integrity data and at least one directional-force sensor (also referred to herein as a weight or force sensor) configured to collect flight parameter data. The system may also comprise a computer processing component communicatively coupled to the inspection station and configured to receive the structural integrity data from the inspection module and determine if a structural integrity of the UAV exceeds a structural integrity threshold, and receive the flight parameter data from the inspection module and determine if a flight parameter exceeds a flight parameter threshold.

II. Operating Environment

Figure 1:
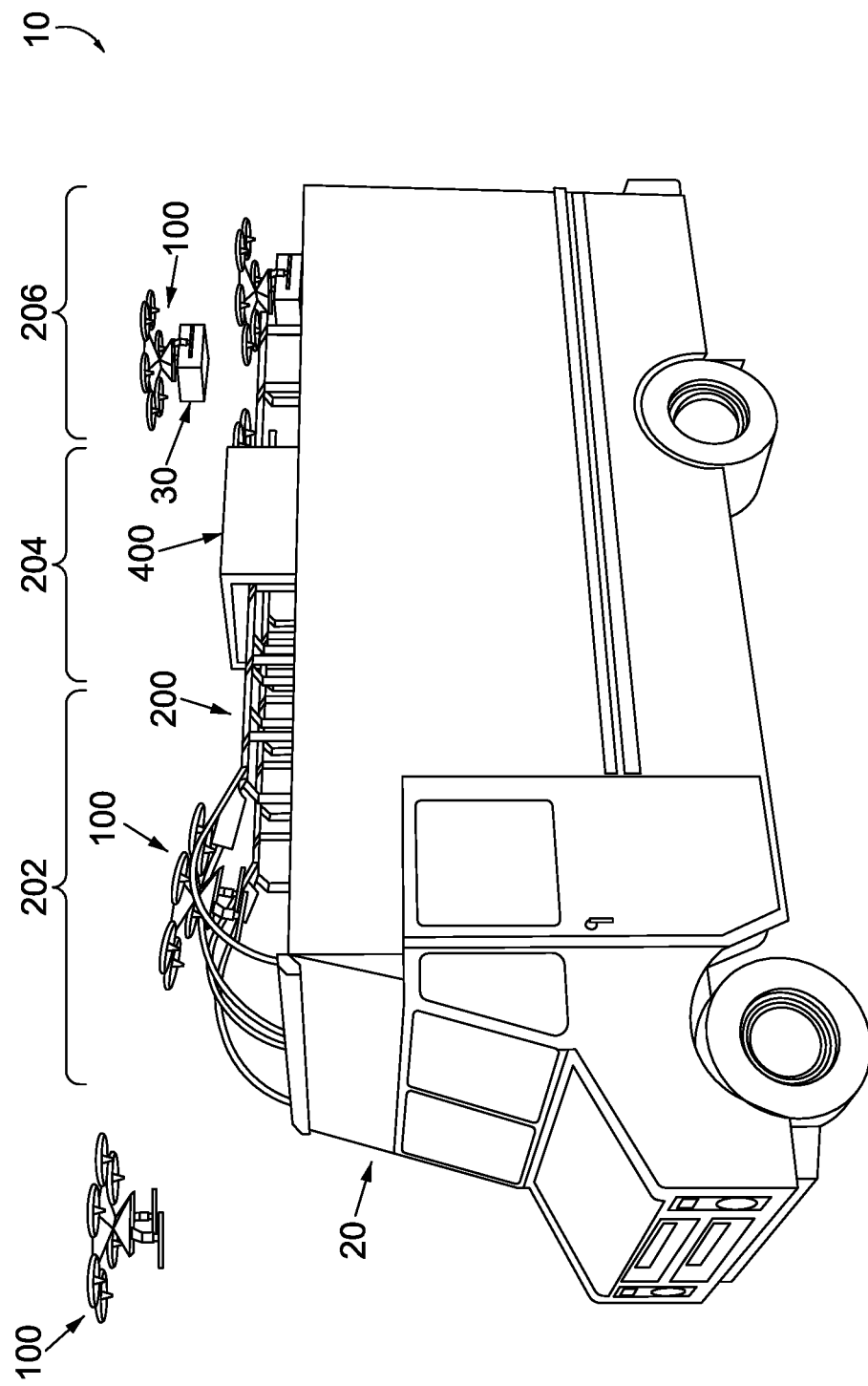
FIG. 1 illustrates an example of a vehicle-borne UAV control system, in accordance with embodiments described herein.

FIG. 1 illustrates one aspect of a UAV control system 10, any one or more portions of which are the subject of the present disclosure. In some aspects, the UAV control system 10 facilitates the safe and effective operation of UAVs, particularly when a single UAV, such as a UAV 100, executes multiple missions. In such a case, as described above, it may be desirable or necessary to inspect the UAV between missions. The UAV control system 10 comprises multiple components, modules, stations, and the like, that cooperate to provide a single, consolidated base of operations for deployment of the UAV(s). In aspects, the UAV control system 10 may generally comprise a vehicle 20 and a rail system 200 coupled to the vehicle 20. In other aspects, the UAV control system may be a fixed terrestrial system (i.e., not capable of being moved without being placed on a movable object), or a semi-mobile terrestrial system (i.e., on a trailer, capable of being towed, but without the inherent ability to do so). In any aspect, the rail system may be said to be divided into a plurality of portions, such as a recovery portion 202, an inspection portion, and a launch portion 206. The recovery portion 202 is configured to allow the approaching UAV 100 to be guided into and/or onto the rail system 200. In some aspects, the recovery portion 202 may also comprise an unloading opening that allows empty cargo or cargo carriers, such as a parcel carrier to be returned to the inside of the vehicle 20. The inspection portion 204 comprises the drone diagnosis system, which will be discussed in greater detail herein. In some aspects the inspection portion 204 may comprise a hangar 400 to at least partially house one or more diagnostic components used to perform one or more inspections, tests, and/or checks on the UAV 100. Depicted as being aft of the inspection portion 204, the rail system may comprise a launch portion 206, which is configured to facilitate the UAV 100 taking off from the vehicle 20. In some aspects, the launch portion 206 may a loading opening that allows cargo or a cargo carrier, such as the parcel carrier carrying a parcel 30, to be retrieved from the inside of the vehicle 20 and coupled to the UAV 100 prior to takeoff.

III. Unmanned Aerial Vehicle

The present disclosure provides for a drone diagnosis system. As introduced above, the drone diagnosis system may be a component on a UAV control system, wherein the UAV control system may further comprise a recovery component, unloading component, cargo component, inspection component, and launching component, all of which are configured to facilitate safe and effective operation of a UAV.

Throughout this disclosure, "unmanned systems" include systems that are capable of operating for at least a period of time without input from an on-board human. Unmanned systems may include terrestrial, aquatic, or aerial vehicles (UAVs). An unmanned system may sometimes include a human on board that is capable of taking control of the unmanned vehicle or that provides instructions to the unmanned system. Some unmanned systems may operate without a human on board, but may be controlled or partially controlled remotely by a human pilot/operator. Some unmanned systems may operate autonomously by receiving instructions from a computer program. Thus, to complete an objective, an unmanned system may operate autonomously, under the guidance of received instructions, or under partial or total control of a human operator. The word "drone" may be considered to be synonymous with "unmanned system," generally, or "UAV," specifically, as used herein.

One example of a UAV appropriate for use in the present disclosure is a multi-rotor aerial vehicle capable of Vertical and/or Short Take-Off and Landing (VSTOL) operations. That is, the UAV may operate more similarly to a helicopter than a conventional airplane, in that it may achieve vertical lift with necessitating sufficient horizontal acceleration to generate enough lift for takeoff, referred to herein as Conventional Take Off and Landing (CTOL). The UAVs illustrated herein are shown as having six rotors; however, it is expressly conceived that UAVs compatible for use with the presently disclosed drone diagnosis system may have any number of rotors, or may be a fixed-wing aircraft, whether or not the UAV is capable of VSTOL operations or CTOL operations, or some combination of both.

As used in this disclosure, the word "delivery" is intended to mean both "to drop off" and "to pickup," unless one of the options is impracticable. For example, a "delivery vehicle" is a vehicle capable of picking up a parcel and dropping off a parcel at a location.

Figure 2:
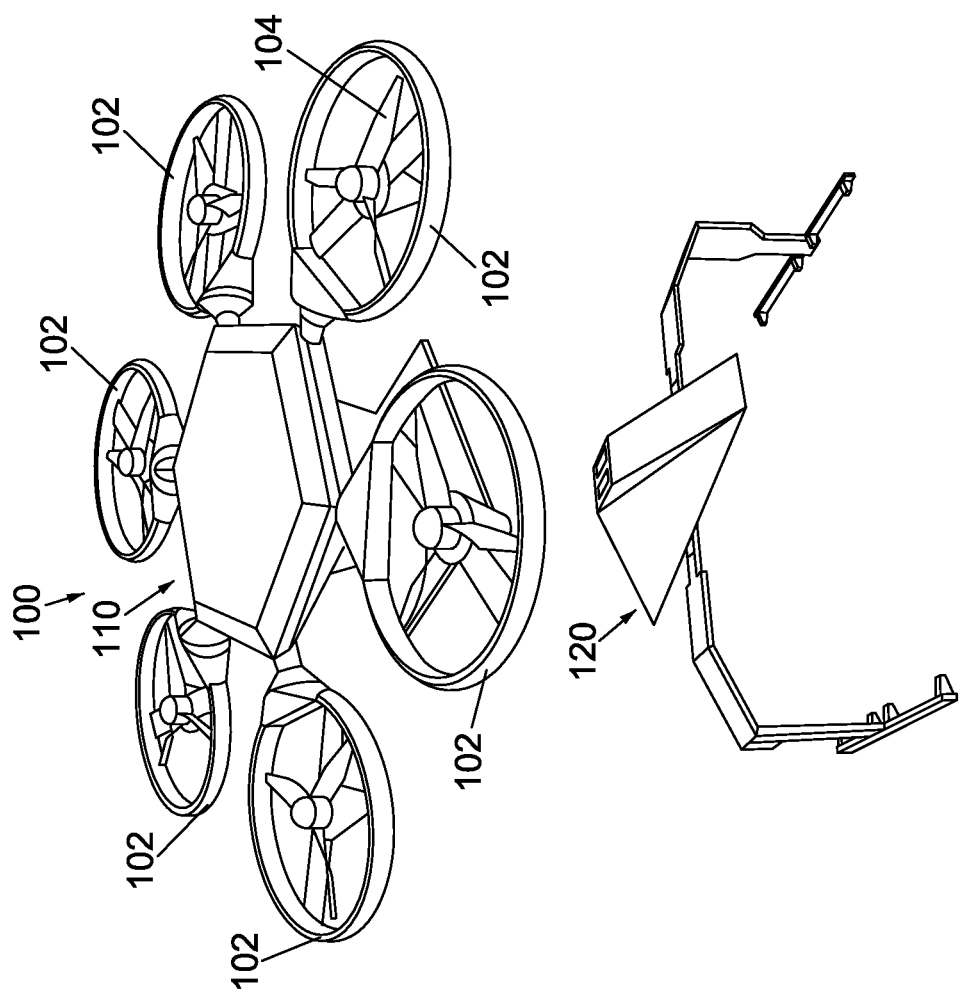
FIG. 2 is a perspective view of a UAV compatible with operation of the UAV control system, in accordance with embodiments described herein.

At a high level, the present technology describes a drone diagnosis system that may be used to facilitate the safe and effective operation of UAVs. Specifically, the drone diagnosis system may be equipped and/or configured to perform any one or more diagnostic tests, inspections, queries, etc., on a UAV with little or no human intervention. Accordingly, FIG. 2 shows a perspective view of a UAV 100 and a parcel carrier 200, which is configured to be coupled to the UAV 100 and to engage a parcel to enable UAV-based delivery of the parcel. In aspects, and as further explained in U.S. patent application Ser. No. 15/582,200, the entirety of which is incorporated herein by reference, the parcel carrier 200 is configured to be temporarily secured to the UAV 100 for transporting a parcel 30 (FIG. 1) and may include a power supply configured to power the UAV 100 when the parcel carrier 200 is engaged with the UAV 100. In other aspects, the power source may be incorporated or detachably coupled to the UAV 100, instead of, or in addition to the power source located in or coupled to the parcel carrier 200.

The UAV 100 may be said to generally comprise a UAV chassis 110 and a plurality of propulsion members 102 extending outwardly from the UAV chassis 110. In some aspects, the propulsion members 102 may comprise one or more rotors or rotor heads, configured to cyclically operate one or more propellers 104. In aspects, the propellers 104 may be fixed pitch propellers, wherein the UAV 100 may achieve various levels of thrust by modifying the rpm and/or torque of the rotor. In other aspects, the propellers 104 may be variable/controllable pitch propellers (CPP), wherein the UAV 100 may achieve various levels of thrust by maintaining a substantially constant rpm but changing the pitch of the propellers 104. The UAV chassis 110 generally defines a body of the UAV 100, which the propulsion members 102 are configured to provide and maintain lift and propulsion during flight. The propulsion members 102 may be operable between an "on" configuration, in which the propulsion members 102 may operate at variable speeds and/or pitches lift to the UAV 100, and an "off" configuration, in which the propulsion members are stationary and/or do not provide lift to the UAV 100. In yet other aspects, the propulsion member may comprise any one or more portions of a directed/vectored thrust system that utilizes engine exhaust (whether directionally variable or fixed) to provide thrust. According to various embodiments, the UAV chassis 110 may be formed from any material of suitable strength and weight (including sustainable and reusable materials), including but not limited to composite materials, aluminum, titanium, polymers, and/or the like, and can be formed through any suitable process.

Figure 3:
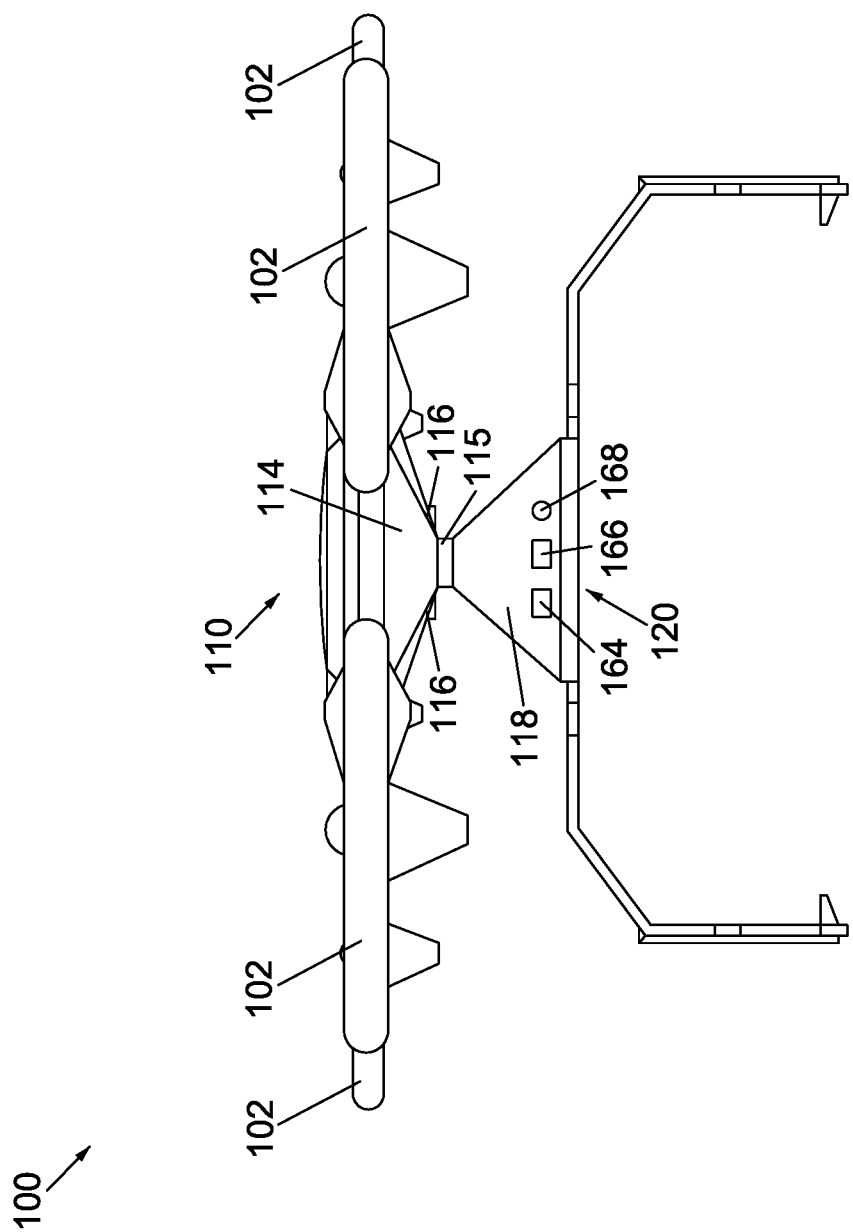
FIG. 3 is a side view of the UAV of FIG. 2, in accordance with embodiments described herein.

Each of the plurality of propulsion members 102 are coupled to and extend around a perimeter of an upper portion 114 of the UAV chassis 110 (best seen in FIG. 3). Each of the plurality of propulsion members 102 includes a propeller 104 that is positioned within a propeller guard. Each propeller 104 is comprised of a plurality of blades that are configured to rotate within the propeller guard to provide lift and facilitate flight of the UAV 100. In the illustrated embodiment, the propeller guards circumscribe the propellers 104 as the propellers 104 rotate, which may assist in preventing inadvertent contact between the propellers 104 and various objects that the UAV 100 may encounter during flight. While the embodiment depicted in FIG. 2 depicts the propellers 104 as including three blades that are configured to rotate within the propeller guards, it should be understood that the propellers 104 may include any suitable number of blades configured to rotate within the propeller guards and provide sufficient lift to the UAV 100.

In the illustrated embodiment, the propulsion members 102 are electrically powered (e.g., by an electric motor that controls the speed and/or pitch at which the propellers 104 rotate). However, as will be recognized, the propulsion members 102 may be powered by internal combustion engines driving an alternator, hydrogen fuel-cells, and/or the like. In some aspects, the propulsion members may be fixed to the UAV chassis 110 in a particular configuration; in other aspects, each of the propulsion members 102 is pivotally coupled to the UAV chassis 110 at a joint such that each of the propulsion members 102 may rotate and/or pivot with respect to the UAV chassis 110. As seen in FIG. 3, the UAV chassis 110 may define an upper portion 114, a lower portion 118 (positioned below the upper portion 114), and a throat portion 115 (positioned vertically between the upper portion 114 and the lower portion 118). Further, the UAV chassis 110 may be generally considered to house the one or more control and flight systems necessary for UAV operation.

In some aspects, such as the one illustrated in FIGS. 2-3, the lower portion 118 of the UAV chassis 110 may be configured to receive and engage the parcel carrier 200 or any other similar cargo-carrying device or payload. In the illustrated embodiment, the lower portion 118 extends downwardly from the UAV chassis' upper portion 114 and resembles a hollow, oblique pyramid-shaped member. The lower portion 118 defines an internal cavity that extends upward into the lower portion 118. The internal cavity defines a bottom opening through which the internal cavity may be accessed. At least a portion of the parcel carrier 200 may be inserted through the opening and into the internal cavity in order to detachably couple the parcel carrier 200 to the UAV chassis 110.

The UAV 100 may further include one or more landing gear 116. In the illustrated embodiment, the landing gear 116 are provided on an underside or downward-facing side of the upper portion 114 of the UAV chassis. In the illustrated embodiment, the landing gear 116 comprise a pair of rollers oriented to face downward in the vertical direction. In some embodiments, the rollers of the landing gear 116 may be powered by the UAV in order to move the UAV along the rail system 200. In some aspects, the landing gear 116 may work cooperatively with the throat portion 115 to establish and maintain a relative position of the UAV on the rail system 200. In other aspects, the landing gear 116 may also be positioned on opposing vertical sides of the throat portion 115 of the UAV chassis such that the landing gear 116 straddle the reduced width portion 115. Furthermore, in various other embodiments, the landing gear 116 may comprise other devices configured for engaging the rail system 200, such as bearings, casters, and/or the like, that rotate with respect to the UAV chassis 110, which may assist in moving the UAV chassis 110 while the UAV is engaged with the rail system 200.

As illustrated in FIG. 3, the UAV 100 may comprise one or more sensors 164, one or more communication ports 166, and one or more cameras 168. Though illustrated on the lower portion 118, it is contemplated that the one or more sensors 164, the one or more communication ports 166, and/or the one or more cameras 168 may be positioned on any suitable portion of the UAV chassis 110, or the UAV 100, generally. In aspects, the one or more sensors 164 may comprise a flight control sensor, such as an accelerometer, compass, gyro, positioning system, or the like. In other aspects, the sensor 164 may comprise a landing sensor, such as a pressure sensor, proximity sensor, or the like, that may be configured to provide an input for determining a proximity or position of the UAV 100 with respect to the rail system 200. The communication port 166 provides a means for communicating with external systems, computers, components, modules, or the like. The communication port 166 may take the form of a wired port (e.g., a female port to receive a corresponding male connection), or a wireless port (e.g., NFC, Bluetooth, IR, or the like). The one or more cameras 168 may be utilized by the UAV 100 to provide navigational input to the flight control system, may be utilized to photograph items of interest to users/customers, etc. The UAV 100 may also IV. UAV Control System Turning now to FIG. 4, a perspective view of an exemplary aspect of the vehicle-borne UAV control system 10 is illustrated. As illustrated, the UAV control system 10 comprises at least one rail system 200 coupled to an outer-facing surface 22 (e.g., a roof) of the vehicle 20 (e.g., a parcel delivery vehicle). Though referred to herein in the context of a vehicle-borne platform, it is conceived that the presently disclosed subject matter could be implemented on other platforms, as disclosed herein. The rail system 200 may comprise a single pair of rails 210 or a plurality of pairs of rails, as illustrated. Each pair of rails 210 may be coupled to the outer-facing surface 30 via a plurality of legs 214. In some aspects, the pair of rails 210 may comprise a locomotive component 213 configured to traverse the UAV 100 from one portion of the rail system 200 to another. In the illustrated embodiment, the locomotive component 213 is shown as a plurality of successive, powered rollers, configured to engage with the throat portion 115 of the UAV 100 and move the UAV 100 progressively aft, relative to the outer-facing surface 22, after being recovered.

The rail system 200 may be said to be divided into and characterized by a plurality of functional portions. The fore-most portion of the rail system 200 may comprise a recovery portion 202. Moving aft, the rail system 200 may comprise an unloading portion 203, an inspection portion 204, and a launch portion 206. The recovery portion 202 is configured to permit the UAV 100 to land on and/or enter the rail system 200. In aspects, the recovery portion 202 may be characterized by a widened opening and guide that is configured to catch and guide the throat portion 115 of the UAV 100 into the properly cooperative orientation with respect to the locomotive component 213. Upon successful recovery and engagement with the rail system 200, the rail system 200 may, via operation of the locomotive component 213, traverse the UAV 100 from the recovery portion 202 to the unloading portion 203.

The unloading portion 203 may comprise a first opening 14 for receiving empty cargo or cargo carriers. For example, the UAV 100 may be configured to perform parcel delivery missions using the parcel carrier 120. Upon completion of the mission, the parcel carrier 120 may be empty and returned to the UAV control system 10 for reuse. While in the unloading portion 203, the empty parcel carrier 120 may be returned to an internal compartment of the vehicle 20 via the first opening 14. Though referred to herein as the unloading portion, the unloading portion 203 may, in some aspects, be used to perform loading operations, wherein a new cargo, such as a loaded parcel carrier 120 coupled to the parcel 30, may be retrieved from the internal compartment of the vehicle 20 and coupled to the UAV 100. After completing unloading and/or loading operations in the unloading portion 203, the rail system 200 may be used to traverse the UAV 100 from the unloading portion 203 to the inspection portion 204.

The inspection portion 204 is characterized by a drone diagnosis system, used to autonomously or semi-autonomously perform inspection and maintenance procedures. The drone diagnosis system may be a collection of sensors, equipment, and/or computer processing components. At a high level, the drone diagnosis system may comprise any one or more of a camera 220, a weight sensor 230, a communication component 242, and a positioning component 240. In one aspect, any one or more of the sensors, equipment, and/or computer processing components may be integrated into the pair of rails 210, one or more of the plurality of legs 214, and/or coupled to the outer-facing surface 30 of the vehicle 20. In other aspects, described in greater detail with respect to FIGS. 6-7B, the drone diagnosis system may take the form of a self-contained module, such as the hangar 400 of FIG. 1.

The drone diagnosis system may comprise one or more cameras 220. The one or more cameras 220 may be of a single type or of multiple types. The one or more cameras 220 may comprise an optical camera, used to perceive electromagnetic waves in the visible portion of the EM spectrum (e.g., 380 nm-750 nm), an infrared camera, used to detect heat signatures, and/or an x-ray camera system. The one or more cameras 220 may be used to perform any number of inspections and maintenance checks. For example, the one or more cameras 220 may be used to inspect each propeller 104 to determine if the propeller has sustained any damage or has a defect. Damage and defects may be identified by capturing an image of the propeller 104 and comparing the captured image to a pre-mission image of the same propeller and/or to a standardized image of the propeller 104. The comparing may reveal visual indications of cracks, splits, chips, warping, discoloration, or any other type of defect with the propeller 104 or the UAV chassis 110. Any one or more of said visual indications may be referred to under the umbrella term of "structural integrity data." In some aspects, the drone diagnosis system may utilize machine learning or artificial intelligence algorithms to carry out the camera based inspections.

The one or more cameras 220 may be utilized to perform nonstructural inspections and maintenance checks. In one aspect, the drone diagnosis system may provide instructions to the UAV 110 to turn on any positioning and/or navigational lights on the UAV 110 in order to determine if said positioning and/or navigational lights are functioning properly. In another aspect, the drone diagnosis system may provide instructions to the UAV to cycle through any moving parts to check their fluid and accurate movement. For example, the drone diagnosis system may provide instructions to the UAV 100 to actuate one or more rotors of the propulsion member 102. The one or more cameras 220 may be used to capture one or more images or video in order to determine whether or not the propellers and/or rotors are experiencing excessive vibration, which could indicate defects on the engine axle, engine mount, rotor, and/or propeller. In another example, the drone diagnosis system may provide instructions to the UAV 100 to actuate one or more flight control surfaces, such as an aileron, cargo release mechanism, landing gear, or any other movable component of the UAV 100. The drone diagnosis system may capture one or more images of said actuated movement in order to determine whether or not the movable components may have a defect, which could be based on the identification or detection of limited or broken movement.

In aspects where the drone diagnosis system comprises an infrared camera or any other type of camera capable of thermal imaging, said camera may be used as part of a stress test of the propulsion members 102. That is, when activated, the propulsion members can be observed by the thermal imaging camera in order to determine that the rotor/engine is not over heating (i.e., it passes a stress test). The thermal imaging camera may also be used to detect if a battery temperature is within operational range and/or whether the temperatures of the flight controller, sensors, or any other electronic component/circuitry onboard the UAV 100 is operating within operational or safe ranges.

The drone diagnosis system may further comprise one or more weight sensors 230 which may be configured to detect the weight and vertical pull associated with the UAV 100. Any one or more data points based on the information captured, measured, determined, or otherwise obtained from the one or more weight sensors, may be referred to under the umbrella term of "flight parameter data." In one aspect, the one or more weight sensors 230 may be integrated into the pair of rails 210. Alternatively, the one or more weight sensors 230 may be positioned on one or more outer facing surfaces of the pair of rails 210 in order that they may be easily removed or replaced. The one or more weight sensors 230 may be any combination of sensors that are configured or capable to measure or determine weight and/or force exerted on the pair of rails 210, such as a strain gauge, force gauge, load cell, or the like. Some of said sensors may be configured to determine an applied weight or force based on a measured change in the sensor's resistance, capacitance, impedance, or the like. Each of the one or more sensors 230 may be communicatively coupled to a computer processing component associated with the drone diagnosis system in order to communicate measurements and/or determinations to the drone diagnosis system Best seen in FIG. 5, one or more weight sensors 230 may be positioned on the top of the pair of rails 210. For example, the one or more weight sensors 230 may comprise a first weight sensor 232 and a second weight sensor 234 coupled to or integrated into a top surface 216 of a first rail 211 of the pair of rails 210. The one or more weight sensors may also comprise a third weight sensor 236 and a fourth weight sensor 238 coupled to or integrated into the top surface of the second rail 212 of the pair of rails 210. Any one or more of the weight sensors 232-238 may work cooperatively to determine a downward force/weight of the UAV 100. For example, the measured force or weights could be averaged, added, or otherwise combined in order to determine whether the current weight of the UAV 100 (with or without a cargo such as a parcel carrier with parcel attached) exceeds a maximum takeoff weight. Any one or more of the weight sensors 232-238 may also be used to identify differences in weight/force which may be indicative that the load/cargo is not balanced or properly attached/stowed with respect to the UAV 100.

Because the UAV 100 is completely secured by the pair of rails 210, the one or more propulsion members 102 can be started and operated without causing the UAV 100 to fly away. To take advantage of this entrapment, one or more weight sensors 230 may be positioned on or integrated into the bottom surface of the pair of rails 210 which would detect the amount of force or weight resulting from the lift generated by the operation of the propulsion members 102. For example, if every propulsion member 102 was operated simultaneously, a total or average measured weight or force could be determined and used to determine the total lift. The total lift to be compared to standard to determine if the UAV 100 is operating within appropriate parameters. If, when all of the propulsion members 102 are operated, a difference is detected between one or more weight sensors on the bottom of the pair of rails 210, the drone diagnosis system may determine that one or more of the propulsion members 102 have a fault as reflected by an un-uniform lift. This fault may be the result of a defect with the rotors or a defect with the ability of the flight controller of the UAV 100 to communicate flight control instructions to the propulsion members 102. In another aspect, a portion of the propulsion members 102 may be operated in order to determine if the UAV 100 is able to yaw, pitch, pan, or otherwise move about a three-dimensional axis as needed in order to carry out a successful mission.

Figure 4:
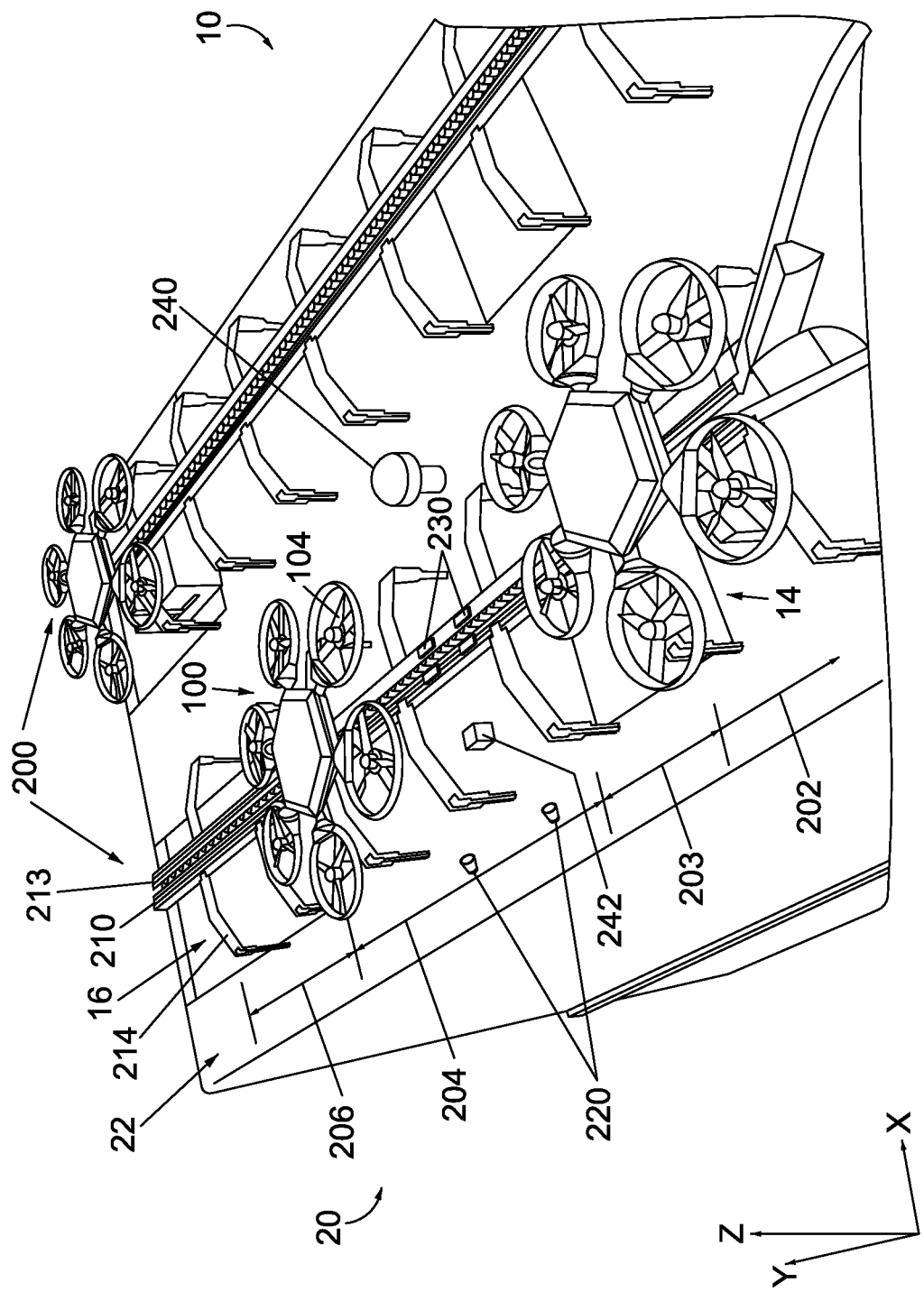
FIG. 4 illustrates one aspect of a UAV control system in accordance with embodiments herein.
Figure 5:
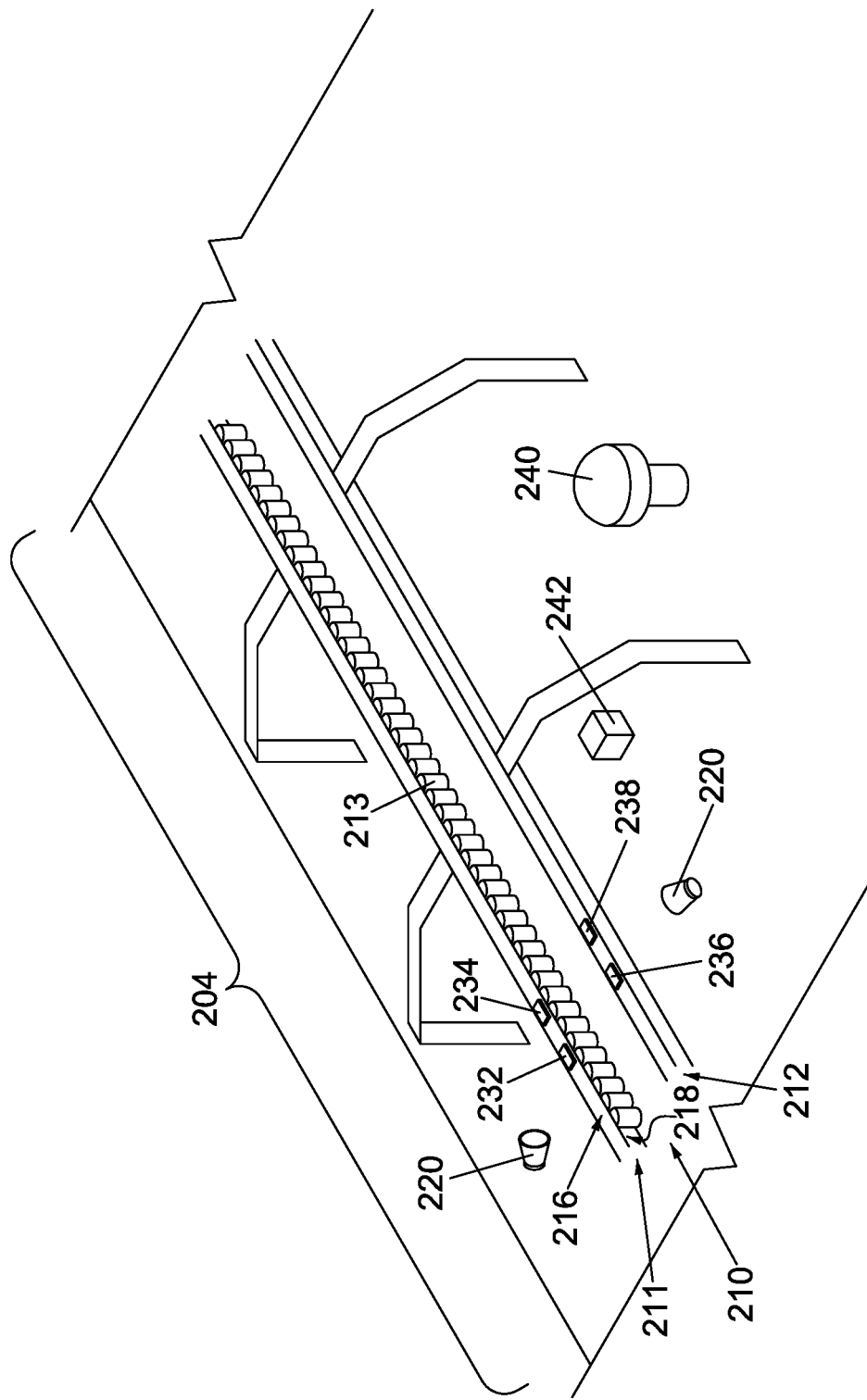
FIG. 5 illustrates a blown up portion of the inspection portion of FIG. 4, in accordance with embodiments described herein.

Seen in FIGS. 4-5, the drone diagnosis system may additionally comprise one or more electronic communication components 242. The electronic communication component 242 may comprise any combination of wired or wireless connections to the UAV 100 in order to obtain electronic status information from the UAV 100. For example, the electronic communication component may comprise an actuating member with a wired connection (similar to a refueling boom), that may be actuated in order to cause the wired connection to be coupled to a corresponding communication port 166 on the UAV 100. In another aspect, if the communication port 166 on the UAV 100 is a wireless communications port, the electronic communication component 242 may comprise a corresponding wireless communication receiver/transceiver. Whether wired, wireless, or a combination of the two, the electronic communication component 242 enables the drone diagnosis system to obtain valuable flight and UAV status information. Specifically, the drone diagnosis system may receive information comprising a UAV-native full onboard systems self-diagnosis, satellite positioning information, information from any one or more sensors 164 located on the UAV 100, and battery status information.

The UAV 100 may be configured to perform a native onboard system self-diagnosis. In such a case, the UAV 100 may identify any one or more problems based on a series of internal tests or based on the performance of the UAV on the previous mission. Such self-diagnosis information may be valuable to the drone diagnosis system, particularly if relevant to characteristics, defects, faults, etc., that are not capable of being readily detected or identified by the sensors of the drone diagnosis system. The UAV 100 may be equipped with one or more position indicating sensors (e.g., GPS, cellular triangulation, and the like) that provide real time or near real time position information to the UAV 100. The drone diagnosis system may receive information from the UAV 100 regarding its currently-determined positions, while entrapped in the inspection portion 204 of the rail system 200. That native position can be compared to a position obtained/determined by the drone diagnosis system via a fixed position indicating sensor 240, proximate to the inspection portion 204. If a discrepancy exists, the drone diagnosis system can provide correction information (e.g., calibrate a new position or provide a delta, such as used in D-GPS) to the UAV 100.

The UAV 100 may be equipped with one or more collision avoidance sensors. While entrapped in the inspection portion 204, the collision avoidance sensors may be triggered by one or more objects extending from the outer-facing surface 22 of the vehicle 20. In some aspects, one or more testing objects located on the outer-facing surface 22 of the vehicle 20 may be actuated in order to force the collision avoidance sensors to be triggered. Once triggered, information from the collision avoidance sensors can be communicated to the drone diagnosis system and compared to the known locations of objects on the outer-facing surface 22 of the vehicle 20 in order to ensure said collision avoidance sensors are properly detecting the presence and range to potential obstructions/hazards. The UAV 100 may also be configured to measure a battery charge or battery health of an onboard battery. If so, the UAV 100 may communicate said battery measurements to the drone diagnosis system.

Using the electronic communication component 242 or through the use of a line of sight (LOS)/B LOS communication link, a communication link (e.g., VHF, UHF) used by the UAV 100 to communicate with the UAV control system 10 during a mission may be tested. The UAV 100 may be configured to record flight data information including missions, mission path, mission incidents, lifecycle management per component, and total flight hours, among others. Said flight data information may be communicated to the drone diagnosis system. The drone diagnosis system may also communicate future flight data to the UAV 100, including a flight path or flight plan for the next mission and estimated flight time versus current battery charge.

The drone diagnosis system may comprise additional features that may be used in the autonomous servicing of the UAV 100. In one aspect, the inspection portion 204 or the drone diagnosis system may comprise one or more foreign object and debris (FOD) removal components. The one or more FOD components may be a nozzle blowing compressed air, a wiper blade, or any other contact or non-contact component that may remove FOD (e.g., dirt and debris) from any one or more portions of the UAV 100, specifically the collision avoidance sensors and one or more cameras 168.

The drone diagnosis system may comprise one or more computer processing components that may be used to receive and/or process measurements and/or determinations from the one or more sensors described herein. The one or more computer processing components may be configured to assign a score to the results of each inspection and/or maintenance check. In some aspects, the score may be numerical (e.g., on a scale of 1 to 10); in other aspects, each score may be a go/no-go. If numerically scored, the drone diagnosis system may determine a total inspection score, wherein the individually scored results are averaged, added or otherwise aggregated to form a single consolidated score. The single consolidated score may be compared to a safe-operation threshold to determine if the UAV 100 is sufficiently safe to operate. The drone diagnosis system may also have one or more unsafe-operation thresholds. When one or more of the individually scored results is below the unsafe threshold, the UAV 100 may be determined to be unsafe or require human follow-up, and grounded (i.e., prevented from launching on a subsequent mission). In a go/no-go scoring system, the drone diagnosis system may determine that the UAV 100 is sufficiently safe for a subsequent mission if every individually scored result is a "go."

After completing diagnostic operations in the inspection portion 204, the rail system 200 may be used to traverse the UAV 100 from the inspection portion 204 to the launch portion 206. The launch portion 206 may be configured to allow the launching of the UAV 100 to a subsequent mission if the drone diagnosis system determines that the condition of the UAV 100 exceeds the safe-operation threshold. If the drone diagnosis determines that the condition of the UAV 100 is below the safe-operation threshold, the UAV 100 may be stowed via a second opening 16 in the outer-facing surface 22 of the vehicle 20. It should be noted that more or fewer openings may exist in the outer-facing surface 22 of the vehicle 20 in order to facilitate loading and unloading operations. For example, a third opening could be located between the unloading portion 203 and the inspection portion 204 in order to load new cargo or a payload on to the UAV 100 (e.g., a parcel carrier 200 carrying a parcel 30).

Figure 6:
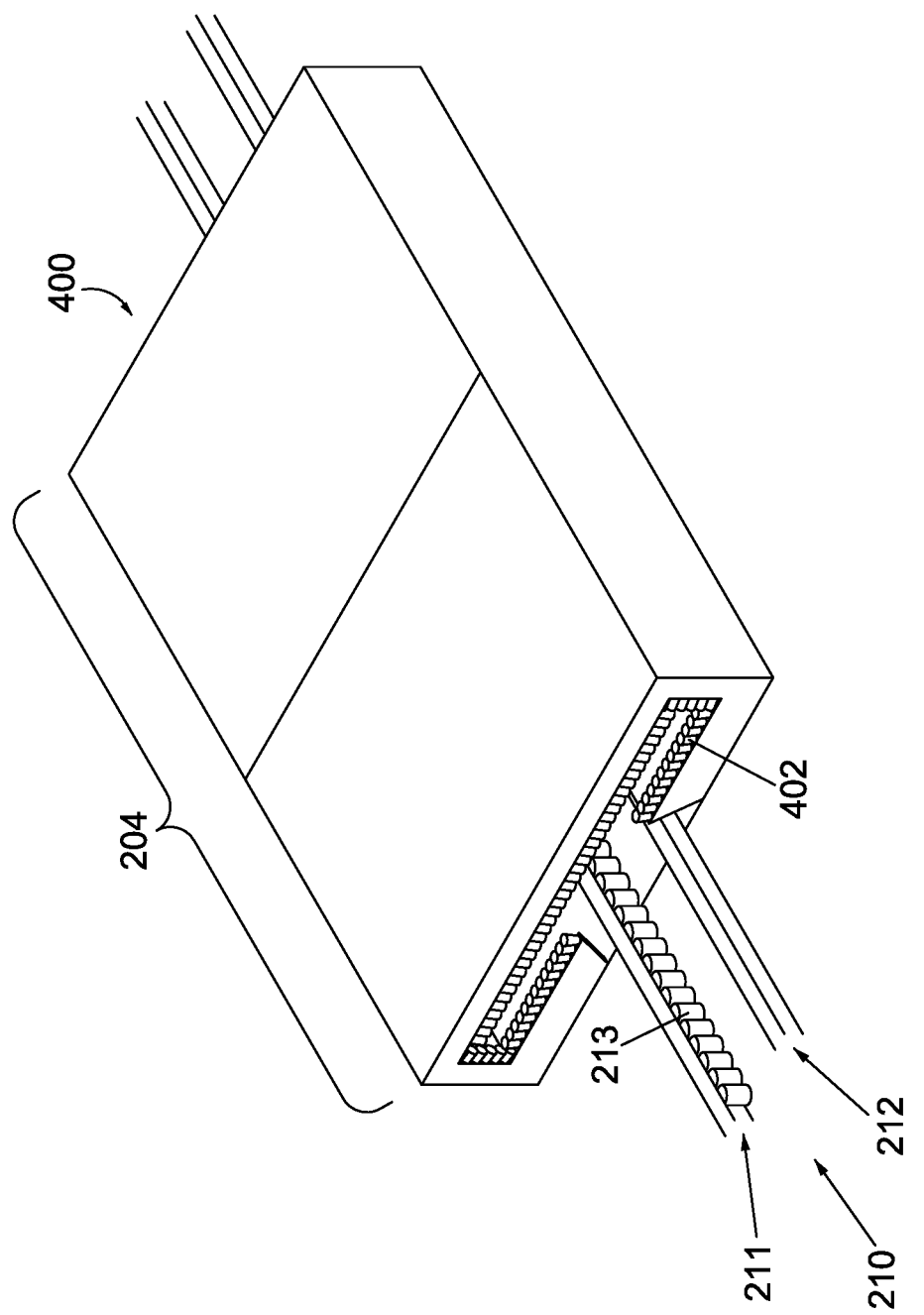
FIG. 6 is one aspect of a self-contained drone diagnosis system, in accordance with embodiments described herein.
Figure 7A:
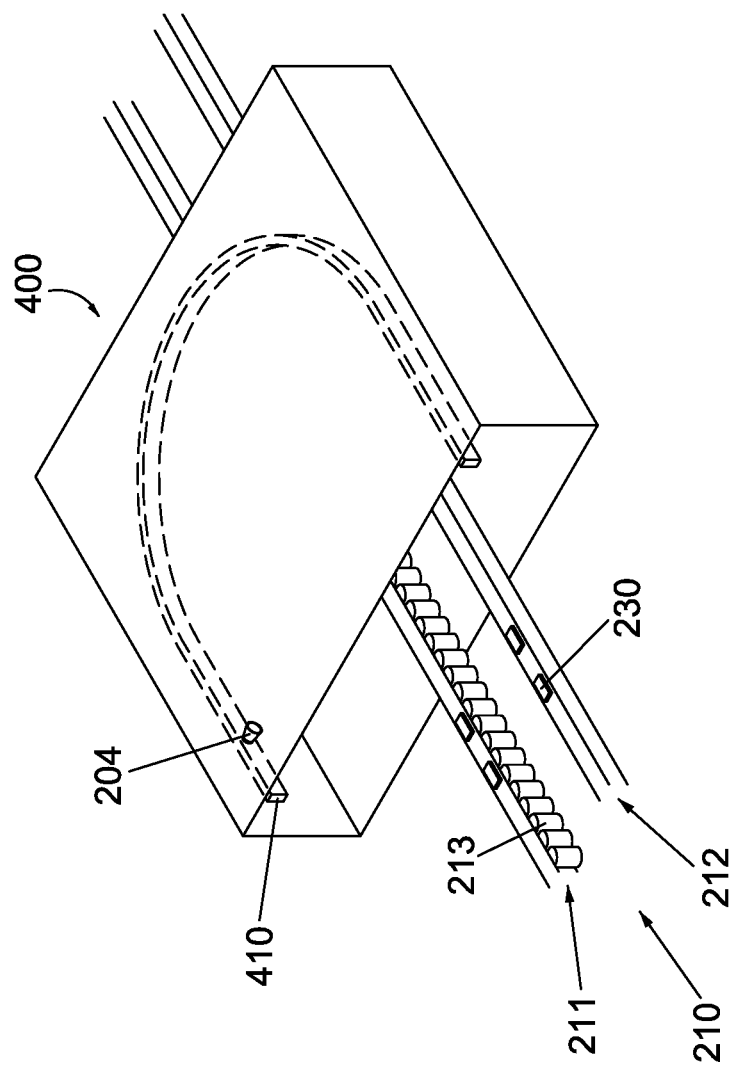
FIG. 7A-B are cutaway view of the self-contained drone diagnosis system of FIG. 6, in accordance with embodiments described herein.
Figure 7B:
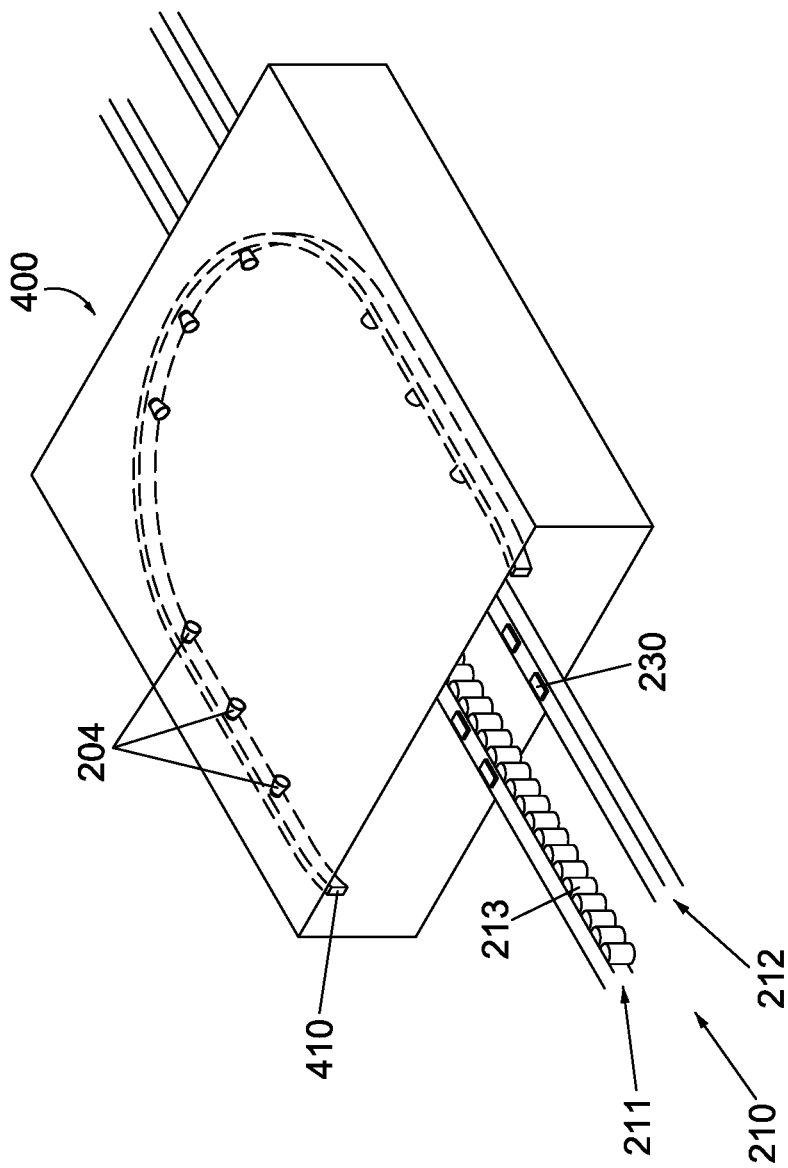

Turning now to FIGS. 6-7B, a self-contained drone diagnosis system is illustrated in accordance with embodiments herein. It may be desirable for the drone diagnosis system to be fully and independently contained in a single module, such that the module can be easily removed, serviced, etc., or to provide protection from the elements for the one or more sensors contained therein. In aspects, the self-contained drone diagnosis system may comprise a hangar 400, which may at least partially enclose at least part of the inspection portion 204. In some aspects, the hangar 400 may be outfitted with dust removal component 402, such as brushes/bristles, to remove FOD from the UAV 100 as it enters the hangar 400. The self-contained embodiment may have any one or more of the sensors, equipment, and computer processing components described with respect to FIGS. 4-5. Unique to the self-contained embodiment, one or more cameras 204 may be coupled to a rail 410. In the aspect seen in FIG. 7A, one or more cameras 204 may be configured to move about the track in order to obtain the desired angles for capturing various imagery described herein. In another aspect, shown in FIG. 7B, one or more cameras 204 may be fixed to a particular location of the track 410 in order to obtain the desired angles for capturing the various imagery described herein.

V. Methods of Use

Figure 8:
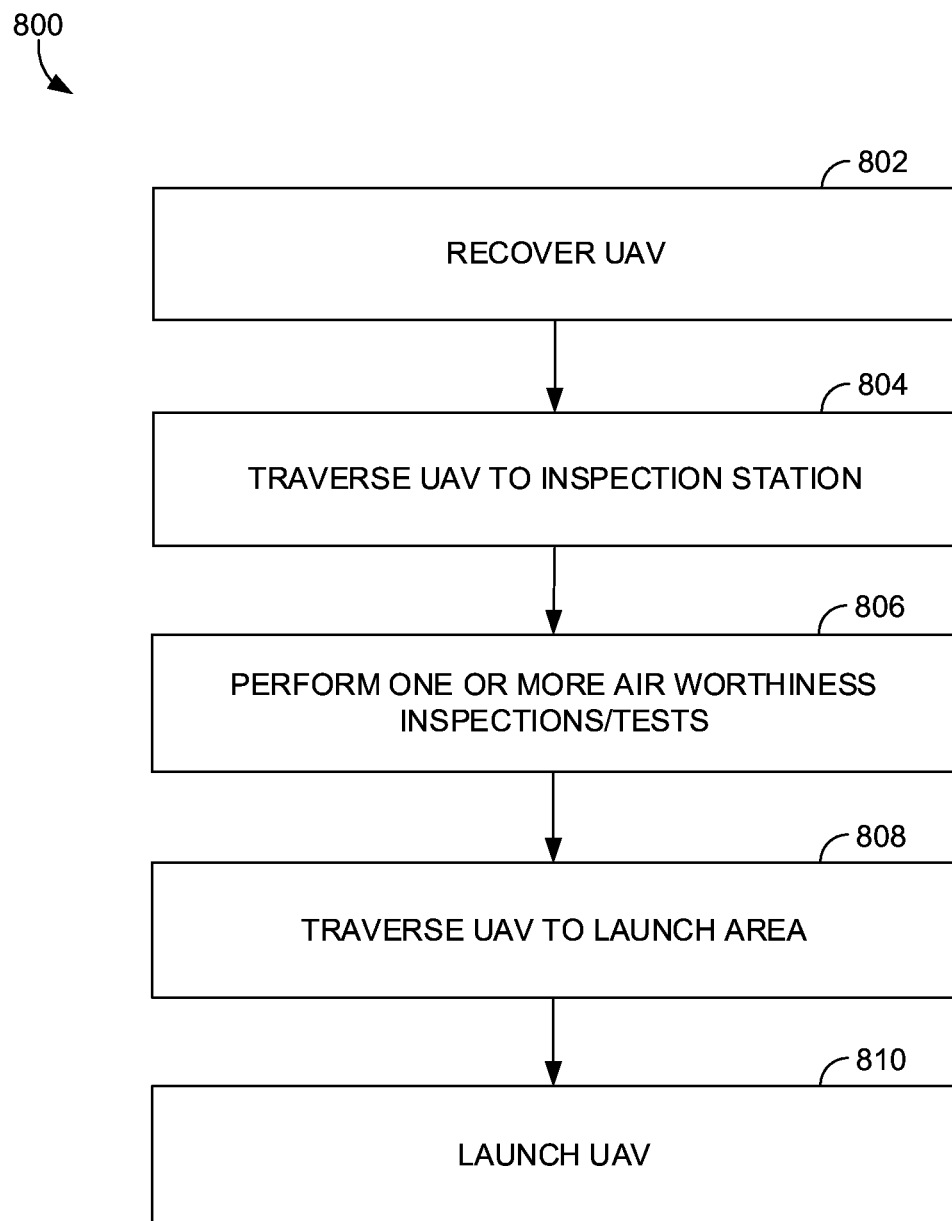
FIG. 8 is a flow chart of an exemplary method for autonomously performing drone diagnostics, in accordance with embodiments described herein.

With reference to FIG. 8, a method for autonomous drone diagnosis is represented in accordance with aspects herein. The method 800 may begin with the recovery of the UAV in a recovery portion of roof-mounted rail of a vehicle-borne UAV control system, as described above, at block 802. At block 804, the UAV is traversed from the recovery portion to the inspection station or inspection portion. While in the inspection portion, at block 806, the UAV may undergo any one or more air worthiness inspections, tests, maintenance checks, etc., as described herein with respect to FIGS. 4-7B. Upon completion of the operations in block 808, the UAV is traversed to a launch area, such as the launch portion 206 of FIG. 4. At block 810, if the drone diagnosis system provides an indication that the UAV is sufficiently safe for a subsequent mission, as described with respect to FIG. 4, the UAV is launched from the vehicle-borne UAV control system on a new mission. If the UAV is determined to not be sufficiently safe for operation, the UAV may be stowed in a compartment of the vehicle-borne UAV control system. After each successfully-completed mission, the method 800 may repeat for each UAV.

VI. Computing Device

Figure 9:
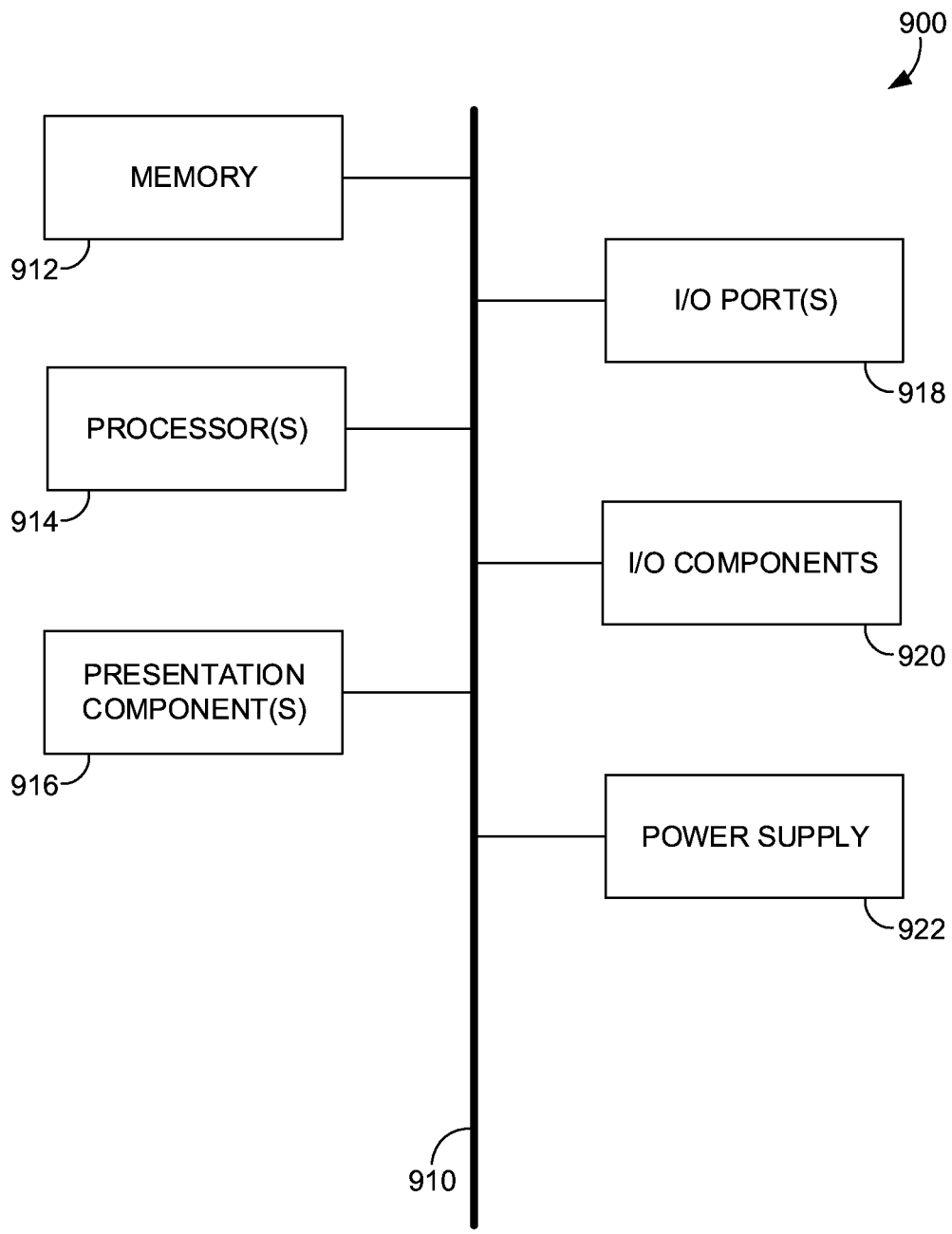
FIG. 9 is an exemplary computing environment suitable performing one or more operations of the present disclosure, in accordance with embodiments described herein.

Referring now to FIG. 9, an exemplary operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output ports 918, input/output components 920, and an illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 9 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include the cameras, weight sensors, satellite positioning systems, external communication components, and/or one or more of the electronic diagnostic components described herein. Additional components may comprise a microphone, joystick, game pad, satellite dish, scanner, printer, wireless device, etc.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims. The described technology may be made without departing from the scope, it is to be understood that all matter described herein or illustrated in the accompanying drawings is to be interpreted as illustrative and not in a limiting sense.

What is claimed is:

1. A system for conducting inspections on an unmanned aerial vehicle (UAV), the system comprising:
   a UAV deployment vehicle;
   an inspection station coupled to the UAV deployment vehicle comprising a first position indicating sensor configured to collect first position data comprising at least one of global positioning system coordinates or cellular triangulation coordinates of the UAV deployment vehicle; and
   a computer processing component communicatively coupled to the inspection station, wherein the computer processing component is configured to:
      receive the first position data from the first position indicating sensor;
      receive second position data from a second position indicating sensor affixed to the UAV, wherein the second position data comprises at least one of global positioning system coordinates or cellular triangulation coordinates of the UAV, and the second position data is collected while the UAV is maintained in the inspection station;
      determine a discrepancy exists between the first position data and the second position data; and
      responsive to determining the discrepancy exists, provide correction information to the UAV, wherein the UAV uses the correction information to calibrate the second position indicating sensor.

2. The system of claim 1, further comprising a rail component coupled to the UAV deployment vehicle, wherein the rail component is configured to maintain the UAV in an inspection portion of the rail component, the inspection portion associated with the inspection station.

3. The system of claim 2, wherein the rail component is further configured to retrieve the UAV from a recovery portion, launch the UAV at a launch portion, and traverse the UAV from the recovery portion to the inspection station, and from the inspection station to the launch portion.

4. The system of claim 1, wherein the inspection station further comprises a directional-force sensor configured to collect a takeoff weight that comprises a combined weight of the UAV and a parcel coupled to the UAV, and the computer processing component is further configured to determine if the takeoff weight exceeds a maximum takeoff weight.

5. The system of claim 1, wherein the inspection station further comprises an optical camera configured to capture an image of at least one of a propeller blade of the UAV or a portion of a body of the UAV.

6. The system of claim 5, wherein the computer processing component is further configured to compare the image to a standard, identify a discrepancy between the image and the standard, and determine a parameter of the discrepancy exceeds a threshold.

7. The system of claim 1, wherein the inspection station further comprises a camera configured to capture an image of one or more components of the UAV.

8. The system of claim 1, wherein the inspection station further comprises a heat sensor configured to measure a battery temperature of a battery coupled to the UAV.

9. The system of claim 8, wherein the computer processing component is further configured to determine the battery temperature satisfies a predetermined threshold.

10. The system of claim 9, wherein the heat sensor comprises an infrared camera.

11. The system of claim 1, wherein the inspection station further comprises a communication component configured to be communicatively coupled to the UAV and collect a self-diagnosis status from the UAV.

12. The system of claim 1, wherein the inspection station further comprises at least one directional-force sensor configured to take one or more lift measurements during operation of one or more lift-causing components, and the computer processing component is further configured to determine the one or more lift measurements satisfy a minimum lift threshold.

13. The system of claim 1, wherein the inspection station additionally comprises a foreign object and debris (FOD) removal component.

14. The system of claim 13, wherein the FOD removal component comprises a compressed air blowdown component.

15. A method for conducting inspections on an unmanned aerial vehicle (UAV), the method comprising:
   receiving first position data from a first position indicating sensor proximate to an inspection station that is coupled to a UAV deployment vehicle, wherein the first position data comprises at least one of global positioning system coordinates or cellular triangulation coordinates of the UAV deployment vehicle;
   receiving second position data from a second position indicating sensor affixed to the UAV, wherein the second position data comprises at least one of global positioning system coordinates or cellular triangulation coordinates of the UAV, and the second position data is collected while the UAV is maintained in the inspection station;
   determining a discrepancy exists between the first position data and the second position data; and
   responsive to determining the discrepancy exists, providing correction information to the UAV, wherein the UAV uses the correction information to calibrate the second position indicating sensor.

16. The method of claim 15 further comprising recovering the UAV on a rail system and traversing the UAV from a recovery portion of the rail system to the inspection station.

17. The method of claim 15 further comprising communicating an instruction to the UAV to perform a subsequent mission.

18. One or more non-transitory computer readable media comprising computer-executable instructions, wherein the computer-executable instructions, when executed by a computer processing component, cause the computer processing component to perform operations comprising:
   receiving first position data from a first position indicating sensor proximate to an inspection station that is coupled to an unmanned aerial vehicle (UAV) deployment vehicle, wherein the first position data comprises at least one of global positioning system coordinates or cellular triangulation coordinates of the UAV deployment vehicle;
   receiving second position data from a second position indicating sensor affixed to an unmanned aerial vehicle (UAV), wherein the second position data comprises at least one of global positioning system coordinates or cellular triangulation coordinates of the UAV, and the second position data is collected while the UAV is maintained in the inspection station;
   determining a discrepancy exists between the first position data and the second position data; and
   responsive to determining the discrepancy exists, providing correction information to the UAV, wherein the UAV uses the correction information to calibrate the second position indicating sensor.

* * * * *